United States Patent
Beutel et al.

(10) Patent No.: US 12,510,059 B2
(45) Date of Patent: Dec. 30, 2025

(54) WIND TURBINE SYSTEM AND INTERCONNECTION OF WIND TURBINE SYSTEMS

(71) Applicant: Siemens Energy Global GmbH & Co. KG, Munich (DE)

(72) Inventors: Stefan Beutel, Berlin (DE); Ismail Cem Bütüner, Berlin (DE); Matthias Steuer, Baiersdorf (DE); Andreas Kleinschmidt, Oranienburg (DE); Johannes Kern, Berlin (DE); Andre Singer, Wandlitz OT Schönwalde (DE); Alexander Nijhuis, Buckenhof (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/726,528

(22) PCT Filed: Dec. 20, 2022

(86) PCT No.: PCT/EP2022/086842
§ 371 (c)(1),
(2) Date: Jul. 3, 2024

(87) PCT Pub. No.: WO2023/126243
PCT Pub. Date: Jul. 6, 2023

(65) Prior Publication Data
US 2025/0075682 A1    Mar. 6, 2025

(30) Foreign Application Priority Data

Jan. 3, 2022 (DE) .................. 10 2022 200 005.6

(51) Int. Cl.
*F03D 80/80* (2016.01)
*F03D 9/25* (2016.01)
*H02B 1/20* (2006.01)

(52) U.S. Cl.
CPC ............ *F03D 80/85* (2016.05); *F03D 9/25* (2016.05); *H02B 1/20* (2013.01); *F05B 2220/706* (2013.01)

(58) Field of Classification Search
CPC . F03D 80/85; F03D 9/25; F03D 80/82; H02B 1/20; H02B 13/02; H02B 13/035; F05B 2220/706; Y02E 10/72
(Continued)

(56) References Cited

U.S. PATENT DOCUMENTS

| | | | |
|---|---|---|---|
| 4,454,596 A * | 6/1984 | Wunsch ............. | G05B 19/0423 439/43 |
| 7,061,133 B1 * | 6/2006 | Leijon ...................... | H02K 3/40 174/DIG. 15 |

(Continued)

FOREIGN PATENT DOCUMENTS

| | | |
|---|---|---|
| DE | 102019207926 A1 | 12/2020 |
| EP | 2873126 B1 | 5/2015 |
| WO | WO 2005083859 A1 | 9/2005 |

OTHER PUBLICATIONS

General Electric: "GE Grid Solutions F35-72.5kV GIS Gas-Insulated Substations For Wind Turbines", Dec. 31, 2017 (Dec. 31, 2017), https://www.gegridsolutions.com/products/brochures/grid-gis-13-35_72.5kv_wind_2017_05_en.pdf [gefunden am Apr. 6, 2023] das ganze Dokument; 2017.

(Continued)

*Primary Examiner* — Charles Reid, Jr.
(74) *Attorney, Agent, or Firm* — Laurence A. Greenberg; Werner H. Stemer; Ralph E. Locher

(57) ABSTRACT

A wind turbine system contains a generator, a tower, and an electrical energy transmission system which is arranged in the tower and which contains a bus bar and three mutually adjacent electrical energy transmission modules. Each electrical energy transmission module has a current path that (Continued)

connects the bus bar to a cable termination of the electrical energy transmission module. At least two electrical energy transmission modules each contain a circuit breaker by which the current path of the electrical energy transmission module can be interrupted. The cable termination of one of the electrical energy transmission modules containing a circuit breaker is connected to the generator.

14 Claims, 4 Drawing Sheets

(58) Field of Classification Search
USPC .......................... 290/44, 55; 307/11, 43, 112
See application file for complete search history.

(56) References Cited

U.S. PATENT DOCUMENTS

| | | | |
|---|---|---|---|
| 7,391,605 | B2 | 6/2008 | Sologuren-Sanchez et al. |
| 2012/0146423 | A1 | 6/2012 | Bodewes et al. |
| 2015/0145349 | A1 | 5/2015 | Bausch et al. |
| 2015/0152850 | A1* | 6/2015 | Nielsen .................. F03D 80/82 307/85 |
| 2017/0356420 | A1* | 12/2017 | Hales ..................... F03D 7/0288 |
| 2018/0269663 | A1* | 9/2018 | Yoshida ............. H02B 13/0352 |
| 2020/0328597 | A1* | 10/2020 | Kretschmann ............ H02J 3/36 |
| 2021/0139154 | A1 | 5/2021 | Klonowski et al. |
| 2022/0231487 | A1 | 7/2022 | Beutel et al. |
| 2023/0143859 | A1* | 5/2023 | Nielsen ................... F03D 9/257 290/44 |

OTHER PUBLICATIONS

Schachner, Josef: "Power Connections for Offshore Wind Farms", Jan. 31, 2004 (Jan. 31, 2005), XP093037572, URL:https://ocw.tudelft.nl/wp-content/uploads/E_infra_master_thesis.pdf [found on Apr. 5, 2023] pp. 19-20; Figure 24; 2004.

Csanyi, Edvard: "Gas-Insulated Switchgear Type 8DN8 / Csanyi-Group", Nov. 24, 2009 (Nov. 24, 2009), XP093038467, URL:http://www.csanyigroup.com/gas-insulated-switchgear-type-8dn8; 2009.

* cited by examiner

WIND TURBINE SYSTEM AND INTERCONNECTION OF WIND TURBINE SYSTEMS

FIELD AND BACKGROUND OF THE INVENTION

The invention relates to a wind turbine system, and to an interconnection of a plurality of wind turbine systems.

A wind turbine system, which is also described as a wind energy installation, generally comprises an electrical energy transmission system, by means of which a generator of the wind turbine system is connected to a power grid. An electrical energy transmission system of this type generally comprises a power circuit-breaker by means of which, if necessary, a current path which incorporates the generator of the wind turbine system can be rapidly interrupted. If a plurality of wind turbine systems are mutually interconnected, it can be necessary for a wind turbine system to comprise a plurality of power circuit-breakers in order to permit the interruption, for example, not only of a current path which incorporates the generator of the wind turbine system, but also of a mutually interconnected arrangement of wind turbine systems, if necessary.

SUMMARY OF THE INVENTION

The object of the invention is the disclosure of a wind turbine system having a plurality of power circuit-breakers, and of an interconnection of a plurality of such wind turbine systems.

According to the invention, this object is fulfilled by a wind turbine system, and by an interconnection of such wind turbine systems.

Advantageous configurations of the invention are the subject matter of the sub-claims.

A wind turbine system according to the invention comprises a generator, a tower and an electrical energy transmission system which is arranged in the tower and which comprises a busbar and three mutually adjacent electrical energy transmission modules. Each electrical energy transmission module comprises a current path which connects the busbar to a cable termination of the electrical energy transmission module. At least two electrical energy transmission modules respectively comprise a power circuit-breaker, by means of which the current path of the electrical energy transmission module can be interrupted. A cable termination of one of the electrical energy transmission modules comprising a power-circuit breaker is connected to the generator.

The invention embodies a wind turbine system, having at least two power circuit-breakers, in the form of three electrical energy transmission modules, at least two of which respectively comprise a power circuit-breaker. The current path of a first electrical energy transmission module which comprises a power circuit-breaker is connected to the generator of the wind turbine system. As a result, if necessary, a current path which is connected to the generator can be interrupted by means of the power circuit-breaker of the first electrical energy transmission module.

The other two electrical energy transmission modules can be employed, for example, for the mutual interconnection of a plurality of wind turbine systems. For example, the second electrical energy transmission module of a first wind turbine system is connected to the current path of an electrical energy transmission module of a second wind turbine system, and the current path of the third electrical energy transmission module of the first wind turbine system is connected to the current path of an electrical energy transmission module of a third wind turbine system. As the electrical energy transmission modules of the first wind turbine system are mutually connected by means of the busbar, the connection of the three wind turbine systems thus remains in place, in the event that the current path of the first electrical energy transmission module of the first wind turbine system is interrupted by means of the power circuit-breaker of the first electrical energy transmission module. As the second or third electrical energy transmission module comprises a power circuit-breaker, this power circuit-breaker can be employed to interrupt the connection of the three wind turbine systems, if necessary.

In one configuration of the invention, each electrical energy transmission module comprises a first housing part, in which a section of the busbar is routed, wherein the first housing parts of adjoining electrical energy transmission modules are mutually connected. In other words, the busbar is routed in the mutually connected first housing parts of the electrical energy transmission modules. As a result, in particular, a gas-tight encapsulation of the busbar can be achieved.

In a further configuration of the invention, each electrical energy transmission module comprises a cable terminal box which is arranged below the first housing part thereof, in which the cable termination of the electrical energy transmission module is arranged. As a result, a space-saving arrangement of cable terminal boxes below the first housing parts is achieved. This is advantageous, as the tower of a wind turbine system assumes a relatively small diameter of only a few meters, and only a limited floor area is available for the arrangement of the three electrical energy transmission modules.

In a further configuration of the invention, in the cable terminal box of that electrical energy transmission module, the cable termination of which is connected to the generator, a current transformer unit is arranged, which is designed to capture a current strength of an electric current flowing in the current path of the electrical energy transmission module and to activate the power circuit-breaker of the electrical energy transmission module for the interruption of the current path, in the event that the current strength exceeds a predefinable threshold value. The current transformer unit permits a monitoring of the current path which is connected to the generator and, if necessary, initiates an interruption of this current path by means of the power circuit-breaker.

In a further configuration of the invention, each electrical energy transmission module comprises a second housing part, which is arranged with an offset in relation to the first housing part and in relation to the cable terminal box, and in which the current path of the electrical energy transmission module is routed between the first housing part and the cable terminal box. This configuration of the invention is also intended to achieve a space-saving design of the electrical energy transmission system.

In a further configuration of the invention, the first housing part and the second housing part of each electrical energy transmission module are configured with a gas-tight design. This advantageously permits a gas-insulated design of the electrical energy transmission system.

In a further configuration of the invention, the power circuit-breaker of each electrical energy transmission module which comprises a power circuit-breaker is arranged in the second housing part of the electrical energy transmission module. In particular, this permits a gas-insulated design of power circuit-breakers.

In a further configuration of the invention, each electrical energy transmission module which comprises a power circuit-breaker comprises a combined disconnector and grounding switch, which is arranged in the first housing part thereof, by means of which the current path of the electrical energy transmission module is interruptible, and a section of the current path which is connected to the power circuit-breaker can be grounded. In particular, this permits a terminal of the respective power circuit-breaker to be grounded, prior to the reclosing of the power circuit-breaker further to the opening thereof.

In a further configuration of the invention, each electrical energy transmission module comprising a power circuit-breaker comprises a power circuit-breaker drive for the power circuit-breaker, which is arranged above the first housing part of the electrical energy transmission module. This configuration of the invention is also intended to achieve a space-saving design of the electrical energy transmission system.

In a further configuration of the invention, one of the electrical energy transmission modules comprises no power circuit-breaker. The electrical energy transmission module which comprises no power circuit-breaker can also comprise a combined disconnector and grounding switch, which is arranged in the first housing part thereof, by means of which the current path of the electrical energy transmission module is interruptible and a section of the current path can be grounded. The design of the electrical energy transmission system with one electrical energy transmission module which comprises no power circuit-breaker is more cost-effective than a design having three electrical energy transmission modules, each of which comprises a power circuit-breaker. Consequently, this design is preferred, if a third power circuit-breaker is not necessary. Otherwise, each electrical energy transmission module comprises a power circuit-breaker, by means of which the current path of the electrical energy transmission module is interruptible.

In a further configuration of the invention, the wind turbine system comprises a switch cabinet, which is arranged adjacently to the first housing part of an electrical energy transmission module. This configuration of the invention is also intended to achieve a space-saving design of the electrical energy transmission system.

In a further configuration of the invention, all control elements and display elements of the electrical energy transmission system are arranged on the same side of the electrical energy transmission system. This permits a simple operation and control of the electrical energy transmission system.

In an interconnection, according to the invention, of a plurality of wind turbine systems according to the invention, cable terminations of the electrical energy transmission modules of the wind turbine systems are connected by means of electrical connections, wherein:
  in each case, at least one cable termination of two mutually connected cable terminations is the cable termination of an electrical energy 17 transmission module which comprises a power circuit-breaker;
  each wind turbine system is interconnected with exactly one further wind turbine system or with exactly two further wind turbine systems;
  at least one wind turbine system is interconnected with exactly one further wind turbine system;
  at least one wind turbine system is interconnected with exactly two further wind turbine systems; and
  each cable termination of an electrical energy transmission module of each wind turbine system which is interconnected with two further wind turbine systems is connected, either to the generator of the wind turbine system or to a cable termination of an electrical energy transmission module of one of the two further wind turbine systems.

An interconnection of wind turbine systems according to the invention of this type permits an interruption of the connection of two wind turbine systems by means of the power circuit-breaker of one of these two wind turbine systems, for example in the event of a defect which necessitates such an interruption. At the same time, however, it is possible to maintain the connection and operation of further wind turbine systems which, for example, are electrically arranged between the two mutually isolated wind turbine systems and an energy collector substation, to which the wind turbine systems are connected (in this regard, see FIG. 4 below).

The above-mentioned properties, features and advantages of the present invention, and the manner in which these are achieved, are more clearly and comprehensibly presented in conjunction with the following description of exemplary embodiments, which are described with reference to the drawings.

BRIEF DESCRIPTION OF THE FIGURES

In the figures, mutually corresponding parts are identified by the same reference numbers.

DETAILED DESCRIPTION OF THE INVENTION

Figure 1:
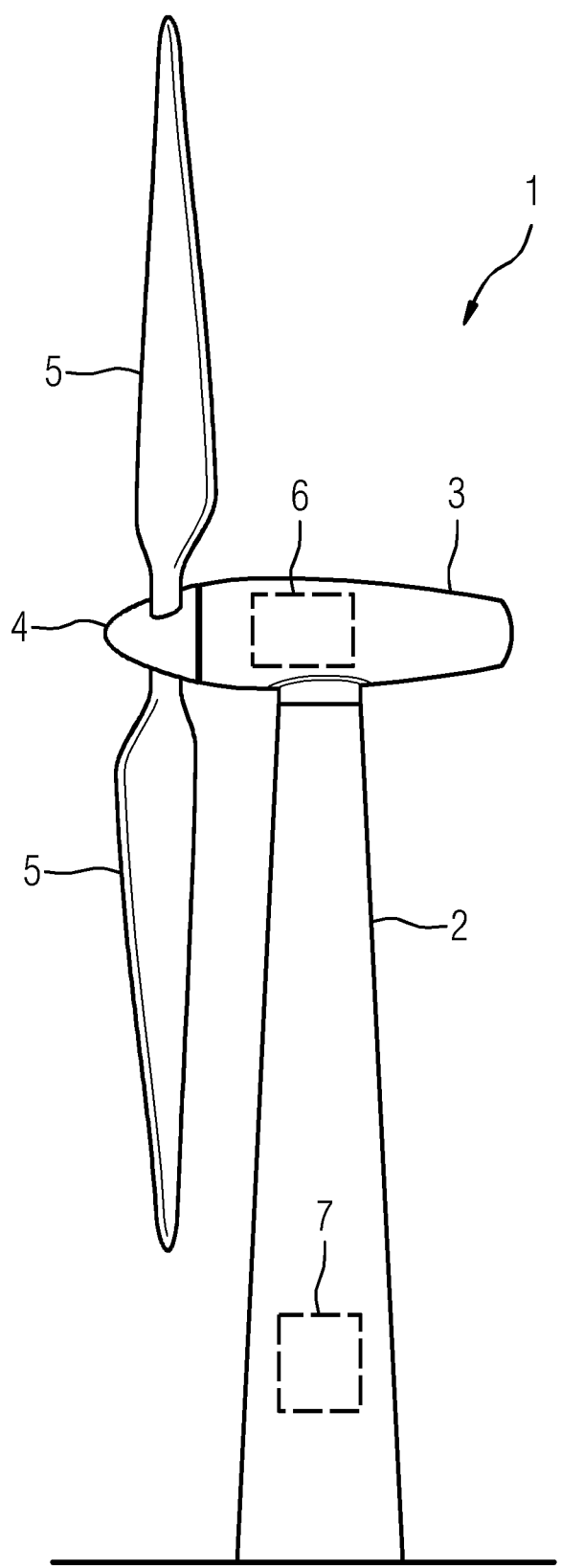
FIG. 1 shows a wind turbine system.

FIG. 1 (FIG. 1) shows a wind turbine system 1. The wind turbine system 1 comprises a tower 2, a nacelle 3, a rotor hub 4 and rotor blades 5. The nacelle 3 is arranged on the tower 2. The rotor hub 4 is rotatably mounted on the nacelle 3. The rotor blades 5 are arranged on the rotor hub 4.

A generator 6 of the wind turbine system 1 is arranged in the nacelle 3. An electrical energy transmission system 7 is arranged in the tower 2.

The wind turbine system 1, for example, is a system in an offshore wind farm.

Figure 2:
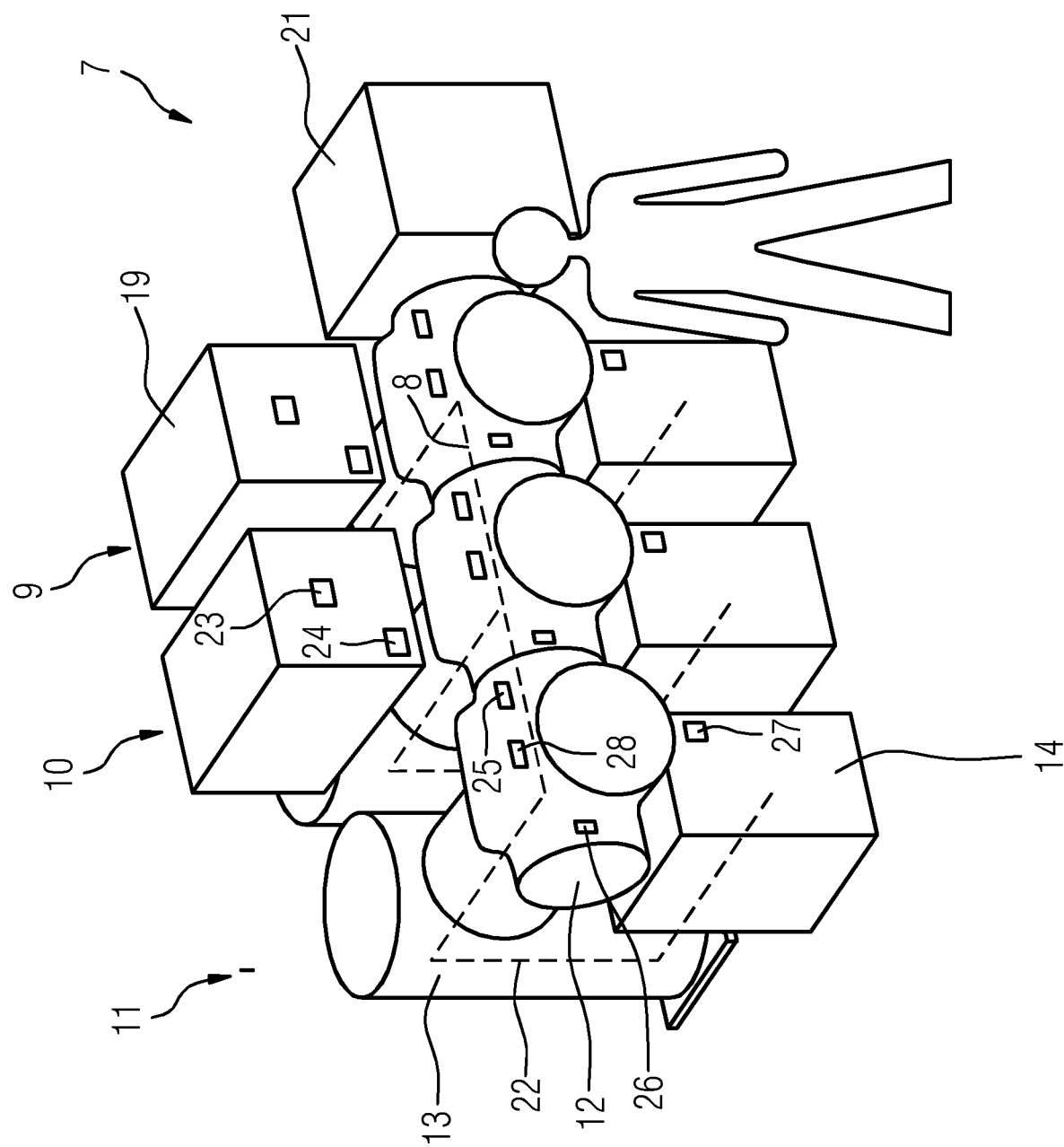
FIG. 2 shows a perspective representation of an electrical energy transmission system of one exemplary embodiment of a wind turbine system.
Figure 3:
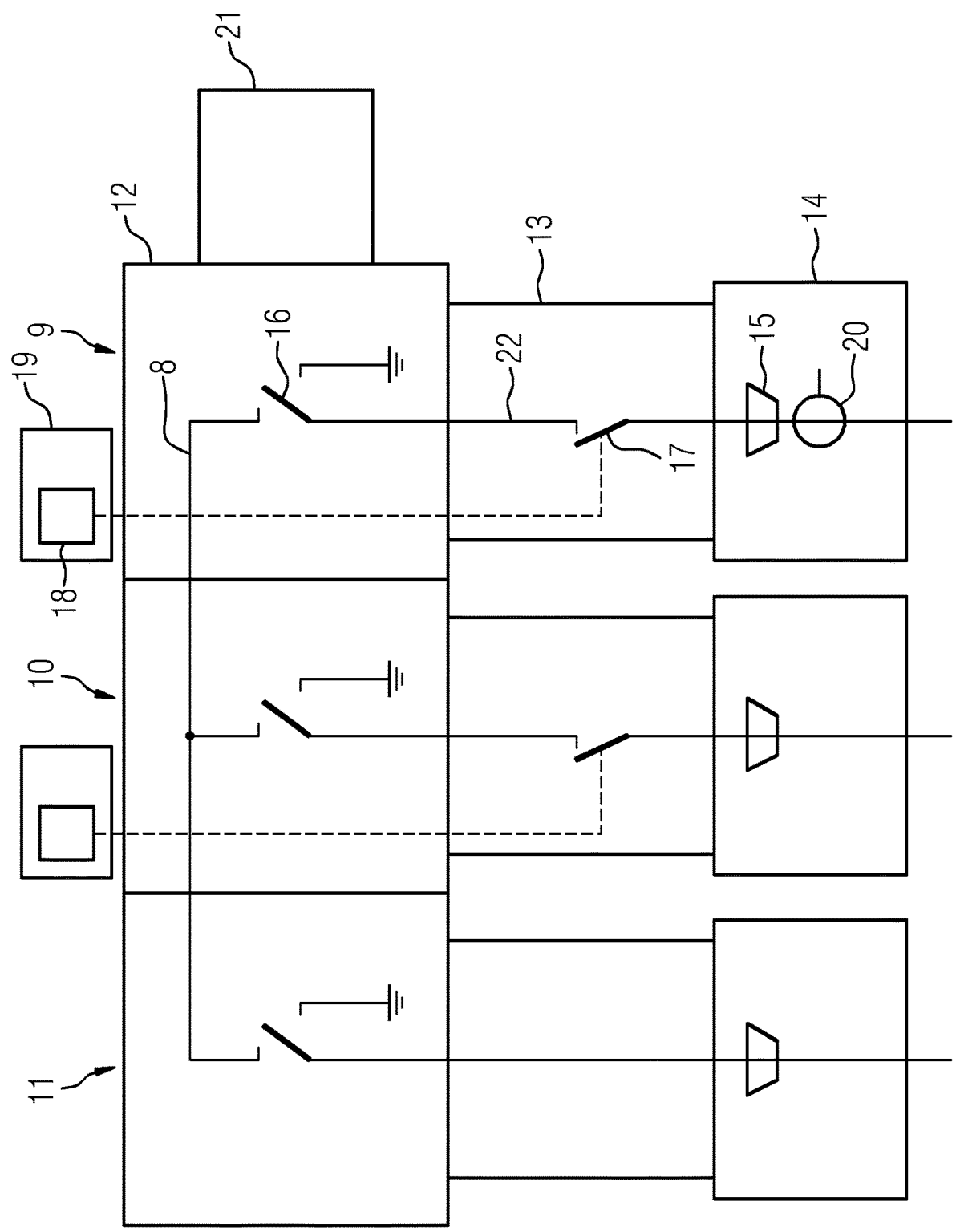
FIG. 3 shows a block diagram of an electrical energy transmission system of one exemplary embodiment of a wind turbine system.

FIG. 2 (FIG. 2) and FIG. 3 (FIG. 3) show an electrical energy transmission system 7 of a wind turbine system 1 according to one exemplary embodiment of the invention. FIG. 2 shows a perspective representation of the electrical energy transmission system 7, and FIG. 3 shows a block diagram of the electrical energy transmission system 7, incorporating a circuit diagram of the electrical energy transmission system 7. In the interests of simplification, the circuit diagram is represented as a single-line diagram, in which the three-phase current path is represented by a single line.

The electrical energy transmission system 7 comprises a busbar 8 and three mutually adjacent electrical energy transmission modules 9, 10, 11. Each electrical energy transmission module 9, 10, 11 comprises a first housing part 12, a second housing part 13 and a cable terminal box 14.

The first housing parts 12 of the adjacent electrical energy transmission modules 9, 10, 11 are mutually connected. In each first housing part 12, a section of the busbar 8 is routed, i.e. the busbar 8 is routed in the mutually connected first housing parts 12.

In the cable terminal box 14 of each electrical energy transmission module 9, 10, 11, a cable termination 15 of the respective electrical energy transmission module 9, 10, 11 is arranged. By means of the cable termination 15 thereof, an electrical energy transmission module 9, 10, 11 can be electrically contact-connected, or is electrically connectable to other devices. The cable terminal box 14 of an electrical energy transmission module 9, 10, 11 is arranged below the first housing part 12 of the electrical energy transmission module 9, 10, 11.

The second housing part 13 of an electrical energy transmission module 9, 10, 11 is configured with an essentially circular cylindrical design, and is arranged with an offset in relation to the first housing part 12 and in relation to the cable terminal box 14 of the electrical energy transmission module 9, 10, 11.

The first housing parts 12 and the second housing parts 13 are configured, for example, with a gas-tight design, in order to permit the embodiment of a gas-insulated electrical energy transmission system 7.

Each electrical energy transmission module 9, 10, 11 comprises a current path which connects the busbar 8 to the cable termination 15 of the electrical energy transmission module 9, 10, 11. The current path 22 is routed from the busbar 8 in the first housing part 12 of the electrical energy transmission module 9, 10, 11 to the second housing part 13 of the electrical energy transmission module 9, 10, 11, and via the second housing part 13 to the cable terminal box of the electrical energy transmission module 9, 10, 11. The current path 22 to the cable termination 15 of the electrical energy transmission module 9, 10, 11 is routed in the cable terminal box 14. The current path 22 of each electrical energy transmission module 9, 10, 11 thus assumes a C-shaped profile (corresponding to a capital C).

The cable termination 15 of a first electrical energy transmission module 9 is connected to the generator 6. In other words, for each phase of the generator 6, a power conductor is routed from the cable termination 15 of the first electrical energy transmission module 9 through the tower 2 to the generator 6.

The cable termination 15 of a second electrical energy transmission module 10 and of the third electrical energy transmission module 11 are respectively connectable or connected to a power grid in which the wind turbine system 1 is situated. For example, the power grid is the power grid of a wind farm in which a plurality of wind turbine systems 1 are mutually electrically interconnected—in this regard, for example, see FIG. 4.

Each electrical energy transmission module 9, 10, 11 comprises a combined disconnector and grounding switch 16 which is arranged in the first housing part 12 thereof, by means of which the current path 22 of the electrical energy transmission module 9, 10, 11 is interruptible.

The first electrical energy transmission module 9 and the second electrical energy transmission module 10 respectively comprise a power circuit-breaker 17 which is arranged in the second housing part 13 of the respective electrical energy transmission module 9, 10. By means of the power circuit-breaker 17, the current path 22 of the respective electrical energy transmission module 9, 10 is interruptible.

Each of the first electrical energy transmission module 9 and the second electrical energy transmission module 10 further comprises a power circuit-breaker drive 18 for the power circuit-breaker 17 of the respective electrical energy transmission module 9, 10, 11. The power circuit-breaker drive 18 is arranged in a drive housing 19 above the first housing part 12 and the second housing part 13 of the respective electrical energy transmission module 9, 10, 11.

A current transformer unit 20 is arranged in the cable terminal box 14 of the first electrical energy transmission module 9. The current transformer unit 20 is designed to capture a current strength of an electric current flowing in the current path 22 of the first electrical energy transmission module 9 and to activate the power circuit-breaker 9 of the first electrical energy transmission module 9 for the interruption of the current path 22, in the event that the current strength exceeds a predefinable threshold value.

The electrical energy transmission system 7 further comprises a switch cabinet 21, which is arranged adjacently to the first housing part 12 of the first electrical energy transmission module 9, 10, 11.

All control elements and display elements of the electrical energy transmission system 7 are arranged on the same side of the electrical energy transmission system 7. FIG. 2 shows exemplary contact position indicators 23 for the respective indication of a contact position of a power circuit-breaker 17, manually operable emergency trip switches 24 for the respective emergency tripping of a power circuit-breaker 17, contact position indicators 25 for the respective indication of a contact position of a disconnector and grounding switch 16, gas-tightness indicators 26 for the respective indication of gas-tightness in the housing parts 12, 13 of an electrical energy transmission module 9, 10, 11, voltage indicators 27 for the respective indication of a voltage which is present in a current path 22, and respective manually operable drives 28 for a disconnector and grounding switch 16.

In the exemplary embodiment represented in FIGS. 2 and 3, the third electrical energy transmission module 11 comprises no power circuit-breaker 17, but is employed for current conduction only. According to further exemplary embodiments, however, it can be provided that the third electrical energy transmission module 11 also comprises a power circuit-breaker 17, and is configured in the manner of the second electrical energy transmission module 10.

Figure 4:
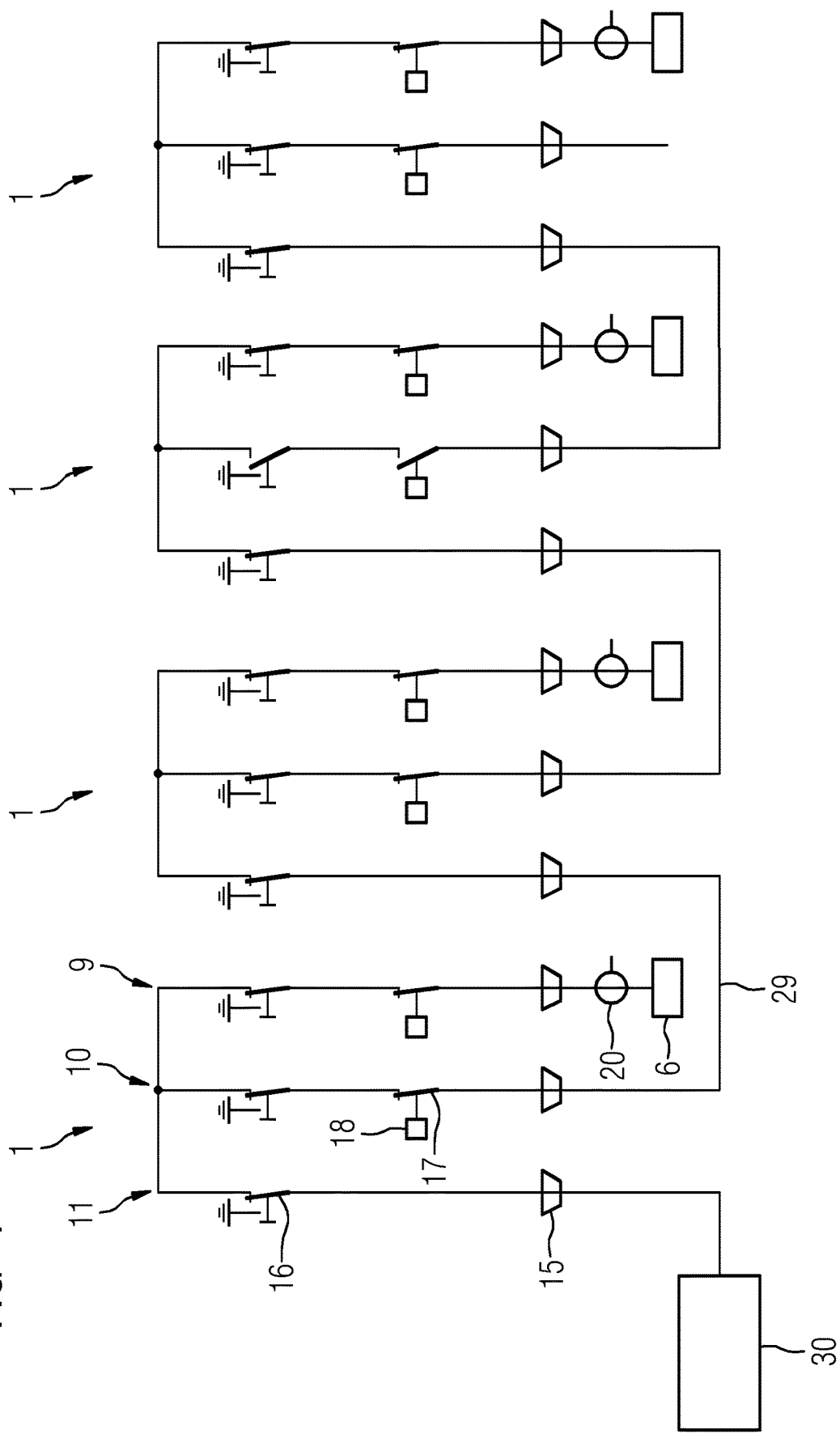
FIG. 4 shows an interconnection of a plurality of wind turbine systems.

FIG. 4 (FIG. 4) shows an interconnection of a plurality of wind turbine systems 1 by means of electrical connections 29 of the cable terminations 15 of the electrical energy transmission modules 9, 10, 11 of the wind turbine systems 1. An exemplary interconnection of four wind turbine systems 1 is represented. The wind turbine systems 1 are respectively represented, in an abstract manner, by a circuit diagram. Each wind turbine system 1 comprises a first electrical energy transmission module 9, which comprises a power circuit-breaker 17 and the cable termination 15 of which is connected to the generator 6 of the wind turbine system 1, a second electrical energy transmission module 10, which also comprises a power circuit-breaker 17, and a third electrical energy transmission module 11, which comprises no power circuit-breaker 17.

The cable termination 15 of the third electrical energy transmission module 11 of a first wind turbine system 1, which is represented on the left-hand side of FIG. 4, is connected to an energy collector substation 30. The cable termination 15 of the second electrical energy transmission module 10 of the first wind turbine system 1 is connected to the cable termination 15 of the third electrical energy transmission module 11 of a second wind turbine system 1, which is represented on the right-hand side of FIG. 4, adjacently to the first wind turbine system 1.

The cable termination 15 of the second electrical energy transmission module 10 of the second wind turbine system 1 is connected to the cable termination 15 of the third electrical energy transmission module 11 of a third wind turbine system 1, which is represented on the right-hand side of FIG. 4, adjacently to the second wind turbine system 1.

The cable termination 15 of the second electrical energy transmission module 10 of the third wind turbine system 1 is connected to the cable termination 15 of the third electrical energy transmission module 11 of a fourth wind turbine system 1, which is represented on the right-hand side of FIG. 4.

An exemplary situation is further represented in which, in response to a defect, the power circuit-breaker 17 and the disconnector and grounding switch 16 of the second electrical energy transmission module 10 of the third wind turbine system 1 are tripped. As a result, the interconnection of the third wind turbine system 1 with the fourth wind turbine system 1 is interrupted. The first wind turbine system 1 and the second wind turbine system 1 can nevertheless be maintained in service. This illustrates the utility of the embodiment of wind turbine systems 1 having (at least) two respective power circuit-breakers 17 for the interconnection of a plurality of wind turbine systems 1.

Although the invention has been illustrated and described in greater detail with reference to preferred exemplary embodiments, the invention is not limited by the examples disclosed, and further variations can be inferred herefrom by a person skilled in the art, without departing from the protective scope of the invention.

The invention claimed is:

1. A wind turbine system, comprising:
a generator;
a tower; and
an electrical energy transmission system disposed in said tower and having a busbar and three mutually adjacent electrical energy transmission modules, wherein:
each mutually adjacent electrical energy transmission module of said mutually adjacent electrical energy transmission modules having a cable termination and a current path connecting said busbar to said cable termination;
at least two of said mutually adjacent electrical energy transmission modules each respectively has a power circuit-breaker, by means of said power circuit breaker said current path of said mutually adjacent electrical energy transmission module is interrupted;
said cable termination of one of said mutually adjacent electrical energy transmission modules having said power-circuit breaker is connected to said generator; and
each of said mutually adjacent electrical energy transmission modules contains a first housing part, in which said first housing part a section of said busbar is routed, wherein said first housing part of each of said mutually adjacent electrical energy transmission modules are mutually connected.

2. The wind turbine system according to claim 1, wherein each of said mutually adjacent electrical energy transmission modules contains a cable terminal box which is disposed below said first housing part thereof, in which said cable termination of each of said mutually adjacent electrical energy transmission module is disposed.

3. The wind turbine system according to claim 2, wherein, in said cable terminal box of each of said mutually adjacent electrical energy transmission modules, said cable termination of which is connected to said generator, a current transformer unit is disposed, said current transformer unit is configured to capture a current strength of an electric current flowing in said current path of said mutually adjacent electrical energy transmission module and to activate said power circuit-breaker of said mutually adjacent electrical energy transmission module for an interruption of said current path, in an event that the current strength exceeds a predefinable threshold value.

4. The wind turbine system according to claim 2, wherein each of said mutually adjacent electrical energy transmission modules contains a second housing part, which is disposed with an offset in relation to said first housing part and in relation to said cable terminal box, and in which the current path of said mutually adjacent electrical energy transmission module is routed between said first housing part and said cable terminal box.

5. The wind turbine system according to claim 4, wherein said first housing part and said second housing part of each of said mutually adjacent electrical energy transmission modules are configured with a gas-tight design.

6. The wind turbine system according to claim 4, wherein said power circuit-breaker of each of said mutually adjacent electrical energy transmission modules which comprises said power circuit-breaker is disposed in said second housing part of said mutually adjacent electrical energy transmission module.

7. The wind turbine system according to claim 1, wherein each of said mutually adjacent electrical energy transmission modules which contains said power circuit-breaker has a combined disconnector and grounding switch which is disposed in said first housing part thereof, by means of said combined disconnector and grounding switch said current path of said electrical energy transmission module is interruptible, and a section of said current path which is connected to said power circuit-breaker can be grounded.

8. The wind turbine system according to claim 1, wherein each of said mutually adjacent electrical energy transmission modules containing said power circuit-breaker has a power circuit-breaker drive for said power circuit-breaker, said power circuit-breaker drive is disposed above said first housing part of said mutually adjacent electrical energy transmission module.

9. The wind turbine system according to claim 1, wherein one of said mutually adjacent electrical energy transmission modules contains no said power circuit-breaker.

10. The wind turbine system according to claim 9, wherein said mutually adjacent electrical energy transmission module which contains no said power circuit-breaker contains a combined disconnector and grounding switch, which is disposed in said first housing part thereof, by means of said combined disconnector and grounding switch said current path of said mutually adjacent electrical energy transmission module is interruptible and a section of said current path can be grounded.

11. The wind turbine system according to claim 1, wherein each of said mutually adjacent electrical energy transmission modules contains said power circuit-breaker, by means of said power circuit-breaker said current path of said mutually adjacent electrical energy transmission module is interruptible.

12. The wind turbine system according to claim 1, further comprising a switch cabinet which is disposed adjacently to said first housing part of said mutually adjacent electrical energy transmission module.

13. The wind turbine system according to claim 1, further comprising control elements and display elements all disposed on a same side of said electrical energy transmission system.

14. An interconnection system, comprising:

a plurality of wind turbine systems each configured according to claim 1;

said cable termination each having an electrical connection interconnecting said wind turbine systems by connecting to said cable termination of said mutually adjacent electrical energy transmission modules of said wind turbine systems;

in each case, said cable termination of two mutually connected cable terminations is said cable termination of said mutually adjacent electrical energy transmission module which contains said power circuit-breaker;

each of said wind turbine systems is interconnected with exactly one further said wind turbine system or with exactly two furthers said wind turbine systems;

at least one of said wind turbine systems is interconnected with exactly one further one of said wind turbine systems;

at least one of said wind turbine systems is interconnected with exactly two further ones of said wind turbine systems; and each said cable termination of said mutually adjacent electrical energy transmission module of each of said wind turbine systems which is interconnected with two further ones of said wind turbine systems is connected, either to said generator of one said wind turbine system or to said cable termination of said mutually adjacent electrical energy transmission module of one of said two further ones of said wind turbine systems.

\* \* \* \* \*